United States Patent

Ross et al.

[11] Patent Number: 5,837,149
[45] Date of Patent: *Nov. 17, 1998

[54] METHOD FOR HOT AND SUPERCRITICAL WATER OXIDATION OF MATERIAL WITH ADDITION OF SPECIFIC REACTANTS

[75] Inventors: David S. Ross, Palo Alto; Indira Jayaweera, Fremont; Roald N. Leif, San Francisco, all of Calif.

[73] Assignee: SRI International, Menlo Park, Calif.

[*] Notice: The term of this patent shall not extend beyond the expiration date of Pat. No. 5,746,926.

[21] Appl. No.: 621,746

[22] Filed: Mar. 22, 1996

[51] Int. Cl.⁶ ........................................ C02F 1/72
[52] U.S. Cl. ..................... 210/759; 210/760; 210/761; 210/909; 210/915; 588/208; 588/218; 588/226; 588/239
[58] Field of Search ................... 210/761, 762, 210/752, 758, 908, 909, 915, 759, 760; 588/208, 218, 226, 233, 239

[56] References Cited

U.S. PATENT DOCUMENTS

| | | | |
|---|---|---|---|
| 4,115,264 | 9/1978 | McCarthy et al. | 210/762 |
| 4,380,960 | 4/1983 | Dickinson | 110/347 |
| 4,543,190 | 9/1985 | Modell | 210/761 |
| 5,232,604 | 8/1993 | Swallow et al. | 210/759 |
| 5,409,617 | 4/1995 | Ross et al. | 210/762 |
| 5,492,634 | 2/1996 | Hong et al. | 210/761 |

OTHER PUBLICATIONS

Savage et al. "Kinetics of Acetic Acid Oxidation in Super-critical Water" *Environ. Sci. Technol.* vol. 29, 1995, pp. 216–221.

Yang et al. Homogenous Catalysis in the Oxidation of pChlorophenol in Supercritical Water, *Ind. Eng. Chem. Res.* vol. 27, 1988, pp. 2009–2014.

*Primary Examiner*—Peter A. Hruskoci
*Attorney, Agent, or Firm*—Howard M. Peters; LeeAnn Gorthey

[57] ABSTRACT

This invention relates to a process for the decomposition of material selected from the group consisting of organic compounds, inorganic compounds, or combinations thereof to compounds which are environmentally acceptable, or are amenable to further degradation by conventional disposal systems to produce environmentally acceptable products, which process comprises: (a) conveying an aqueous solution or an aqueous slurry of material into a reaction zone capable of withstanding the temperatures and pressures of decomposition of the material; (b) contacting the material in the reaction zone with aqueous sodium carbonate as a reactant in an amount effective to decompose the material under hot water or supercritical water oxidation conditions of between about 300° and 600° C. and a pressure of between about 20 and 400 atmospheres for between 0.1 and 120 min, wherein the sodium carbonate at the reaction conditions is present at about 10% or less as a water soluble salt as compared to the solubility of the salt at ambient conditions, wherein the process occurs in the presence of a gaseous oxidant present in an amount of between about 0.1 and 50% by weight of the material; (c) producing about 99% or greater of the decomposition of the material, or 99% or greater conversion of the material to compounds which are environmentally acceptable or to compounds which are amendable to further degradation; and (d) optionally degrading further the compounds produced in step (c) by reaction to environmentally acceptable products. Preferably, the specific reactant is sodium carbonate and the oxidant is oxygen or air.

19 Claims, 5 Drawing Sheets

Fig. 6

METHOD FOR HOT AND SUPERCRITICAL WATER OXIDATION OF MATERIAL WITH ADDITION OF SPECIFIC REACTANTS

BACKGROUND OF THE INVENTION

1. Field of the Invention

The present invention relates to an improved method for the hot and supercritical water oxidation and decomposition of materials, such as waste, using a specific reactant, e.g., a carbonate. The reaction rate is accelerated, acid gases are removed during the reaction, and the usual corrosion of the metal reactors and lines under the operating conditions is eliminated or is greatly reduced.

2. Description of the Problems and the Related Art

In the past a number of methods have been used to decompose materials, which are hazardous or toxic, to products which are innocuous or are environmentally friendly, or to intermediates which can be further degraded using existing secondary material treatment methods. Some alternative practices which have been used include, for example, hot water, supercritical water oxidation (SCWO), wet air oxidation, incineration, molten salt oxidation, plasma arc disposal, hydrothermal liquid oxidation, molten metal pyrolysis, and the like. Each of these methods has their own advantages and disadvantages depending upon the type of material feed stock.

In the chemical area, U.S. industry generates about 1.5 billion tons of hazardous waste each year. This compares to the aggregate of 365 million tons of product production of the 50 largest volume chemical products, or a remarkable 4 tons of hazardous waste per ton of actual product. A large portion of this waste discharge is organic in nature, and a suitable means for its treatment remains a major challenge to the technical community. Presently, U.S. industry must also dispose of 600,000 tons of chlorinated waste each year, which is incinerated in certified incinerators. These incineration units are expensive to operate, and are subject to continuing serious questions of environmental impact of the effluent gases produced.

In the military area, the long-standing question of the safety and public acceptance of incineration for the destruction of chemical weapons is under intense scrutiny. The magnitude of the problem is significant. It is estimated that 31,000 tons of mustard gas agents and nerve gas agents are stored in several U.S. Army installations around the country. In Oregon, the U.S. Army's plans to install an incinerator complex are being opposed by a public group.

In the international arena, the government of Japan is committed to rid China of immense quantities of war gases abandoned there by the Japanese over 50 years ago. It is estimated that some 2 million canisters of poison gases are scattered around China in various stages of decay. The use of incineration is being seriously questioned by Japanese authorities.

Supercritical water oxidation usually requires high temperatures of about 400° C. or higher. Therefore, it is necessary to have special equipment to safely contain the reaction and to overcome the corrosion problems.

Some specific references include the following:

S. V. Hossain et al. In U.S. Pat. No. 5,075,017 disclose a method for removing polychlorinated benzodioxans and polychlorinated dibenzofurans from paper mill sludge under supercritical or near supercritical conditions.

M. Modell in U.S. Pat. No. 4,338,199 describes a supercritical water oxidation of waste at temperatures of 350° to 600° C.

M. Modell in U.S. Pat. No. 4,543,190 discloses the treatment of various chlorinated organics other than dioxins with supercritical water, and states that conversion of these materials to chlorinated dibenzodioxins was not observed.

Supercritical water oxidation conditions to treat organic waste materials is disclosed in PCT publication WO 81/00854, in Modell, U.S. Pat. No. 4,113,466, in Burleson, U.S. Pat. No. 4,564,458 and in Tilmar, U.S. Pat. No. 4,594,164.

L. Jin, et al. (1992), "Catalytic Supercritical Water Oxidation of 1,4Dichlorobenzene," *Chem. Eng. Sci.*, Vol. 47, pp. 2659–2664.

N. Keevil (1942), "Vapor Pressure of Aqueous Solutions at High Temperatures," *J.Am. Chem. Soc.*, Vol. 64, pp. 841–850.

J. Meyer, et al. (1995), "Acetic Acid Oxidation and Hydrolysis in Supercritical Water," *AIChE Journal*, Vol. 41, pp. 2108–2121.

G. Morey, et al. (1956), "Pressure-Temperature Curves in Some Systems Containing Water and a Salt," *J. Am. Chem. Soc.*, Vol. 78, pp. 4249–4252.

D. S. Ross, et al., in U.S. Pat. No. 5,409,617 disclose the hydrothermal oxidation of waste materials using certain salts wherein water as a liquid is always present.

P. Savage, et al. (1991), "Phenol Oxidation In Supercritical Water: Formation of Dibenzofuran, Dibenzo-p-dioxin, and Related Compounds," *Environ, Sci. Technol.*, Vol. 25, pp. 1507–1510.

All patents, articles, publications, references, standards and the like cited in this application are incorporated herein by reference in their entirety.

It is apparent that a need exists to overcome slow reaction times, the severe reaction conditions of decomposition of materials and also the problem of the corrosion of the equipment used. The present invention provides at least one solution to these problems.

SUMMARY OF THE INVENTION

The present invention relates to a process for the decomposition of material which is selected from the group consisting of organic compounds, inorganic compounds, or combinations thereof to compounds which are environmentally acceptable, or are amenable to further degradation by conventional disposal systems to produce environmentally acceptable products, which process includes:

(a) conveying an aqueous solution or an aqueous slurry of material into a reaction zone capable of withstanding the temperatures and pressures of decomposition of the material;

(b) contacting the material in the reaction zone with aqueous specific reactant, e.g. sodium carbonate, as a reactant in an amount effective to decompose the material under supercritical water oxidation conditions of between about 300° and 600° C. and a pressure of between about 10 and 400 atmospheres for between about 0.1 and 120 min, wherein the specific reactant, e.g. sodium carbonate, at the reaction conditions is present in the medium having about 10% solubility or less of the solubility compared to the solubility at ambient conditions, wherein the process occurs in the presence of a gaseous oxidant, wherein said oxidant is present in an amount of between about 0.1 and 50% by weight of the material, e.g., waste, wherein each carbon atom of the material has at least one oxygen for complete reaction;

(c) producing about 99% or greater of the decomposition of the material, or conversion of 99% or greater of the material to compounds which are environmentally acceptable or to compounds which are amendable to further degradation; and (d) optionally degrading further the compounds produced in step (c) by a secondary reaction to environmentally acceptable products.

In a preferred embodiment, the specific reactant is an inorganic salt which at hot water or supercritical water conditions is insoluble in the fluid medium having about 10% solubility or less of the solubility compared to the solubility of the salt at ambient conditions, and also reacts with acid gases produced during the decomposition.

In another embodiment, the materials of construction of the reaction zone, i.e., in the reactor, are corroded (or decomposed) at about 0.1% or less under the hot water or supercritical water oxidation conditions, preferably about 0.01% or less, and more preferably about 0.001% or less.

In another embodiment, the material, e.g. waste, comprises at least one organic compound which is present in about 90 percent by weight or greater of the total material.

In another embodiment, at least one organic compound comprises a halogenated organic compound, and the process occurs with less than 0.1 percent corrosion (or decomposition) of the materials of construction of the reaction zone.

In another embodiment, in step (b), the temperature is between about 350° and 450° C. and the pressure is between about 10 and 400 atmospheres, and the time of reaction is between about 0.1 and 120 min.

In another embodiment, the preferred temperature is between about 373° and 400° C., and the presence is between about 100 and 300 atm.

In yet another embodiment the specific reactant is selected from the group consisting of sodium carbonate, calcium oxide, calcium hydroxide, magnesium oxide, magnesium hydroxide, mixtures thereof, and the like. Sodium carbonate is preferred.

In another embodiment, the material is selected from halogenated organic compounds, phosphorus-containing organic compounds, sulfur-containing organic compounds, nitrogen containing compounds or combinations thereof.

DETAILED DESCRIPTION OF THE INVENTION AND PREFERRED EMBODIMENTS

Definitions

As used herein:

"CFC" refers to special halogenated organics, the chlorofluorocarbons, preferably those CFCs which are used in the refrigerator or air conditioning (home, office, plant/manufacturing facility, or motor vehicle). The commercial CFCs include but are not limited to volatile substituted methane or ethane, for example, dichlorodifluoromethane, chlorodifluoromethane, sym-dichlorotetrafluoroethane, and the like.

"DCB" refers to dichlorobenzene.

"Halogenated organic compound" refers to those aliphatic and aromatic and aliphatic-aromatic organic compounds, which have a halogen atom selected from fluorine, chlorine, bromine or iodine. Usually, the organic compound contains one or more chlorine atoms. Halogenated organic compounds include, but are not limited to, CFCs (see above), cleaning solvents such as methyl chloroform, 1,1,2-trichloroethylene; PCBs; PBBs, including pesticides, herbicides, etc.

"HG" refers to a mustard war gas.

"Hot water" refers to water at temperatures of about 300° C. or greater, preferably about 330° C. or greater, more preferably about 350° C. or greater, to 400° C.

"Material" refers to organic compounds, inorganic compounds, organometallic compounds and combinations thereof. Usually, the material is a waste or a reaction by-product. Organic compounds are preferred. "Material" includes organic compounds, having one or more atoms of nitrogen, sulfur phosphorous oxygen and combinations thereof.

"Organic nitrogen compounds" as materials include, but are not limited to, aniline, nitrobenzene, nitrotoluene, dinitrotoluene, trinitrotoluene, nitroglycerin, pentaerythrityl, tetranitrate-picric acid or combinations thereof.

"Organic phosphorus compounds" refer to, but are not limited to, phosphonic acids, alkyl phosphonates, aryl phosphonates, or combinations thereof.

"Organic sulfur compounds" refer to, but are not limited to, organic sulfonic acids, alkyl mercaptans, $H_2S$, alkyl sulfates, aryl sulfates, or combinations thereof.

"Oxidant" refers to an oxidizing agent which is a gas at the reaction conditions. Oxidants include air, oxygen, ozone, hydrogen peroxide, combinations thereof, and the like. Active oxidant is present at between about 0.1 to 200 wt % of material present, preferably between about 0.1 to 100 wt %, and more preferably between 0.1 and 50 wt %. Each carbon atom of the material to be decomposed requires at least one oxygen molecule for complete reaction to $CO_2$.

"SARIN" refers to a phosphorous containing war gas.

"Specific reactant" refers to a compound which is consumed during the reaction and usually accelerates the reaction. Specific reactant is one which is essentially insoluble in the fluid medium at supercritical conditions, and reacts to neutralize acid gases produced during the decomposition. Preferred specific reagents include, for example, sodium carbonate, calcium oxide, calcium hydroxide, magnesium oxide, magnesium hydroxide and combinations thereof.

In the SCWO literature for decomposition of a hazardous halogenated organic, e.g. tetrachlorobenzodioxin, in the presence of an oxidant, such as oxygen, the reaction is slow and produces acid, hydrogen chloride, which corrodes the materials of construction of the reaction.

Figure 3:
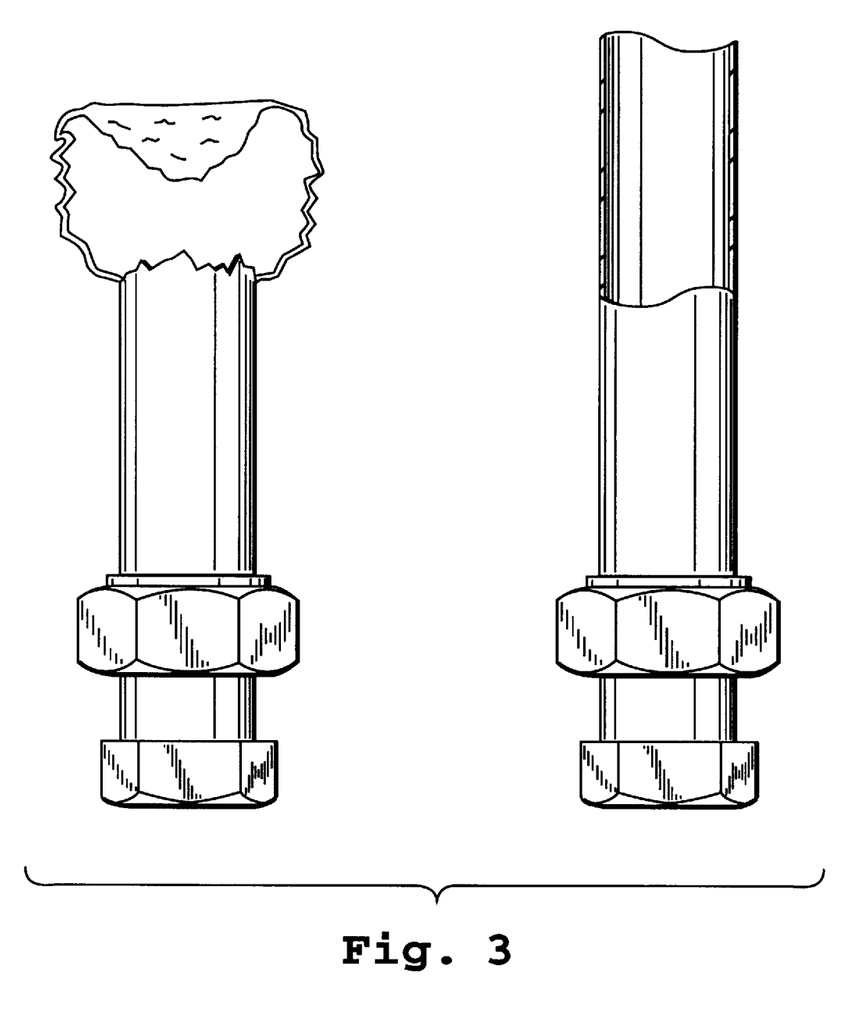
FIG. 3 is a line drawing adapted from a photograph showing on the left side the corrosion and failure of a pipe during conventional SCWO of dichlorobenzene at 374° C., having 0.12 Molar of p-dichlorobenzene and 0.72 Molar of oxygen, and on the right side the lack of corrosion in a pipe of a sodium carbonate (3 g) (0.5M or $1.4\times10^{-3}$ moles in 3 mL) assisted hydrothermal oxidation of p-dichlorobenzene under the same conditions.

See below and FIG. 3, left side.

Figure 1:
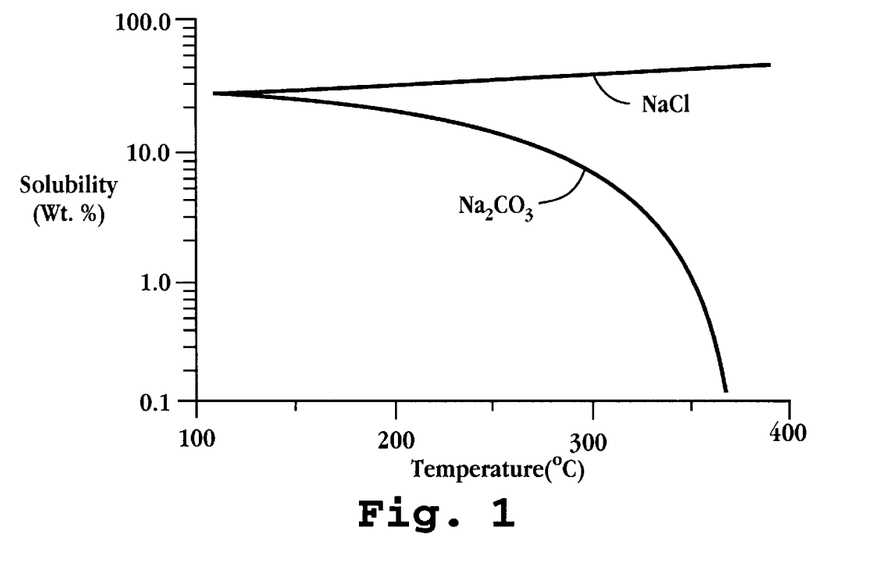
FIG. 1 is a graph describing the solubility behavior of sodium chloride (soluble) and specific reactant, e.g. sodium carbonate, which is about 90% insoluble at 300° with the water at conditions along the liquid/vapor line and essentially insoluble in the fluid (gaseous water) at or above the critical temperature of water (373° C.).

In the present technology, the solubility behavior of various salts in liquid water at elevated temperatures is important, as shown in FIG. 1, which is created from data by Keevil (1942) and Morey, et al., (1956). FIG. 1 shows the continuing solubility increase in the medium with increasing temperature of sodium chloride up to 400° C. This solubility at elevated temperatures in the water medium is reflected in the behavior of the majority of common salts, including sodium bromide, sodium iodide, sodium nitrate, and most potassium salts, including potassium carbonate. As FIG. 1 shows, these saturated salt systems avoid critical behavior, do not improve the reaction, and form no part of this invention.

In direct contrast to this solubility behavior of various inorganic salts, the solubility of a specific reactant, such as sodium carbonate, in water medium rapidly decreases at higher temperatures, specifically at about 300° C., at about 350° C. and above, and to and above the critical temperature of water at 374° C. Critical behavior is observed with specific reactants, such as sodium carbonate, which are about 90% insoluble in water medium at 300° C., and which become essentially insoluble in the aqueous medium at and above the critical temperature of 374° C. at 220 atm. A few other salts behave in a similar way, including calcium oxide, calcium hydroxide, sodium sulfate, sodium fluoride, and sodium triphosphate.

In another aspect of the specific reactant as present in the reaction, it serves to react and neutralize any acid gas produced in the decomposition.

Figure 2:
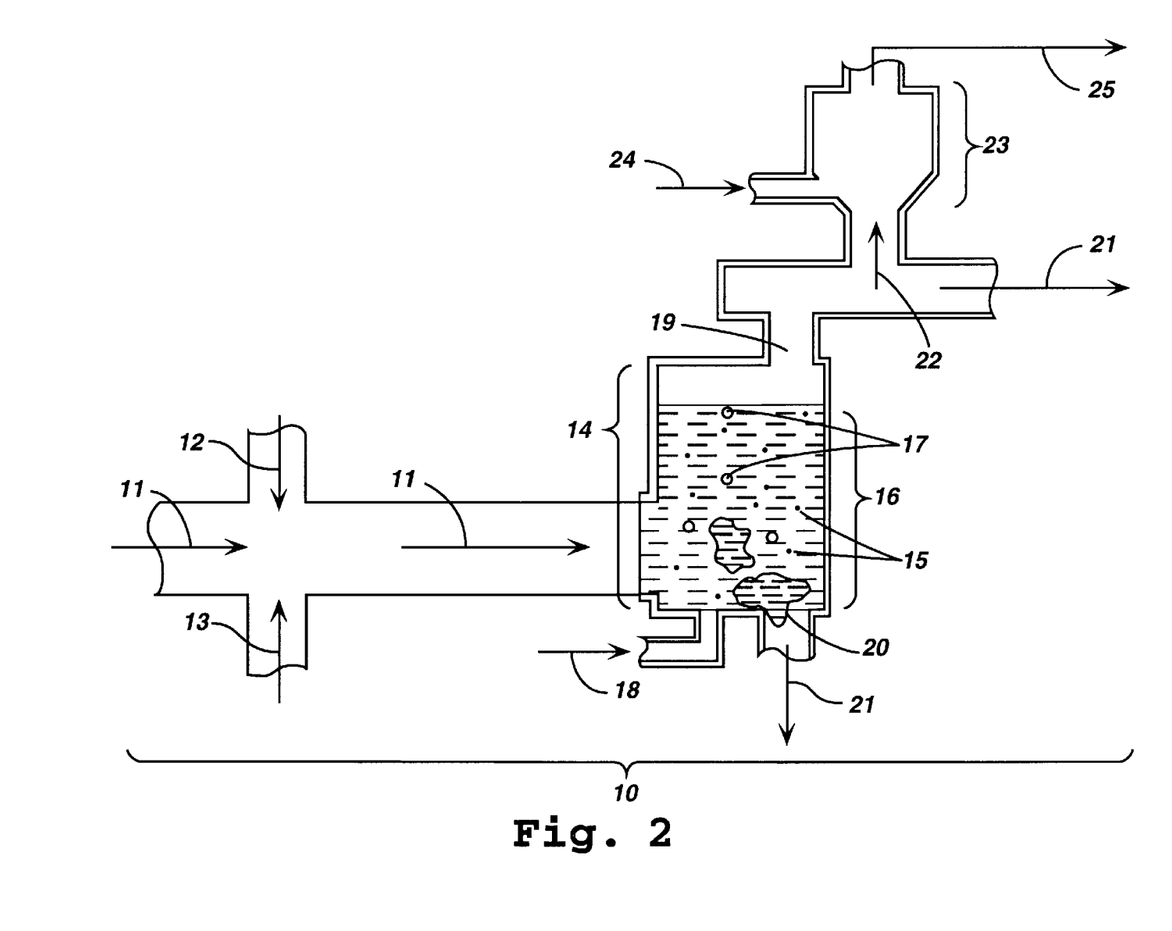
FIG. 2 is a schematic representation of one embodiment of the present hot water and SCWO oxidation.

In FIG. 2 of one embodiment of the present process, equipment configuration (10) is shown in which hot water or supercritical water oxidation is essentially carried out using a fluidized bed of specific reactant. The incoming feed stream (11) of waste material as a solid, solution, or slurry, added specific reactant as a solid or slurry (12), such as sodium carbonate, and water (13) is heated in reaction zone 14 to about 300° to 600° C., at between about 10 and 400 atm, e.g. 380° C./220 atm, or above the critical point of water. The specific reactant 15, e.g. sodium carbonate, is insoluble in the fluid and is effectively a reactive fluid bed (16), fluidized by the mixture of water and oxidant 17 (air or oxygen) (as stream 18) entering from the bottom of unit 14. The surface area of reactant, e.g. sodium carbonate is about 180 cm²/g or higher. The surface activity of the specific reactant at these conditions (i.e. suspended in a supercritical water medium at liquid densities at a temperature where its solubility drops essentially to zero) is substantial, and converts the waste materials readily and rapidly to simple oxygenates. These oxygenates exit reaction zone (14) at opening (19) and are then rapidly oxidized to carbon dioxide with the oxygen present. Dense brine (e.g. NaCl, NaNO$_3$, etc.) (20) exits at the bottom of the reaction zone (14). Water is separated at 21 and optionally is recycled at to incoming stream 18. Specific reactants, such as sodium carbonate, are commercially available, are inexpensive, and are therefore a suitable consumable reactant. The cost of the present process using sodium carbonate as the specific reactant and oxygen as the oxidant is estimated to be about $0.08 per gallon at a rate of 300 gallon per minute (gpm).

A large range of materials can be treated with this technology, including, but not limited to: waste, ordnance, chemical warfare agents, energetic materials, explosives, paint sludges, chlorofluorocarbons, various polymer wastes, phosphorous organic compounds, nitrogen-organic compounds, sulfur organic compounds, halogenated wastes, e.g. cleaning solvents, dairy waste, pharmaceutical waste, food waste (as described in U.S. Pat. No. 5,409,617) and the like.

In the optional final step, the product stream 22 is passed through a secondary decomposition reactor 23 such as, for example, a commercial oxidizer, e.g., a Thermatrix Flameless Oxidizer, available from Thermatrix, Inc. of San Jose, Calif., having an air inlet 24 which completes the conversion of any trace, nonacceptable volatile gases which are not eliminated in the fluid bed, thus assuring an acceptable exhaust stream (25).

Figure 4:
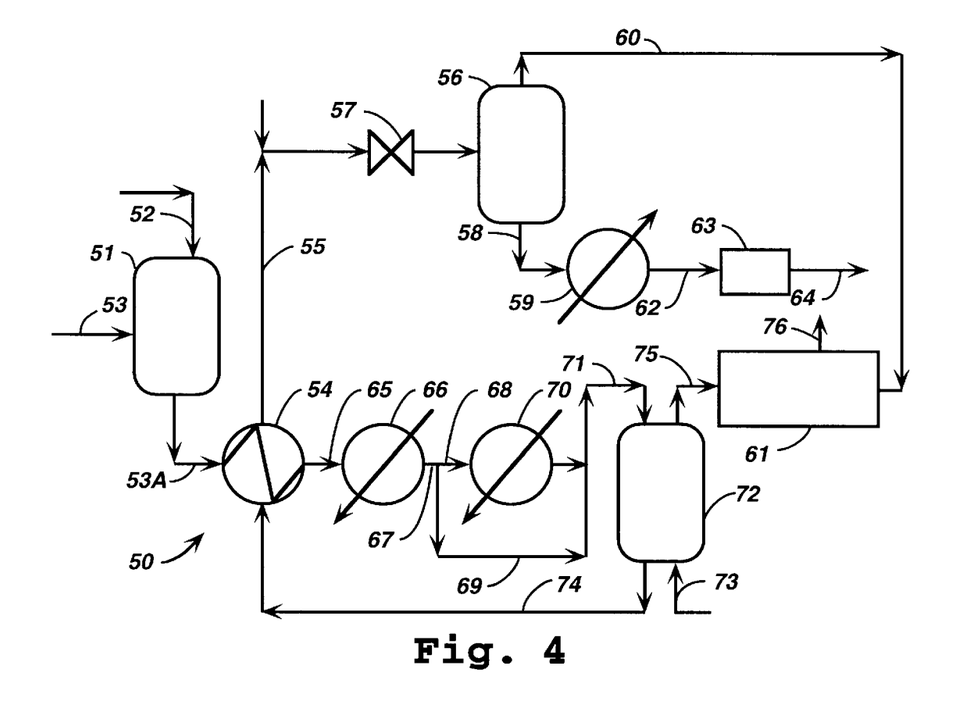
FIG. 4 is a schematic representation of another embodiment of the present hot water and SCWO oxidation.

FIG. 4 is another embodiment of the present process having equipment configuration (50). To feed vessel 51 is added solid or aqueous specific reactant 52, such as sodium carbonate, and material 53 to be decomposed, usually in a water solution. The mixture in vessel 51 is conveyed to economizer 54 via line 53A where the mixture is heated to about 300° to 600° C. at about 10 to 400 atm. A portion of the water is removed from the reaction mixture at elevated temperature and conveyed via line 55 to be added to water heater 56 through valve 57 and through line 58 to flash vessel 59. If necessary, a portion of the high boiling liquid is conveyed through line 60 to the secondary decomposition reactor 61. As necessary, a portion of the liquid in flash vessel 59 is conveyed through line 62 to brine cooler 63 which exits via line 64 to the environment. The major portion of the reaction mixture in economizer 54 is conveyed via line 65 to preheater 66. The reaction mixture exits preheater 66 via line 67 and is split into line 68, which leads to a start up heater 70, and line 69 which leads via to line 71 to hydrothermal reactor 72. In reactor 72, the reaction mixture is heated to about 300° to 600° C. under pressure in the presence of an oxidant entering reactor 72 via line 73. A portion of the reaction product is recycled to economizer 54 via line 74. The effluent gases exit reactor 72 via line 75 to a secondary decomposition unit 61, e.g. a Thermatrix unit. The acceptable gases are produced and vented to the environment via line 76.

Sodium carbonate, when added to an aqueous reaction mixture and heated as is described herein, readily converts chlorinated organics, such as tetrachlorobenzodioxin or polychlorinated biphenyls (PCBs).

A model compound to study the decomposition of tetrachlorobenzodioxin or polychlorinated biphenylenes is p-dichlorobenzene (DCB).

p-dichlorobenzene

Figure 5:
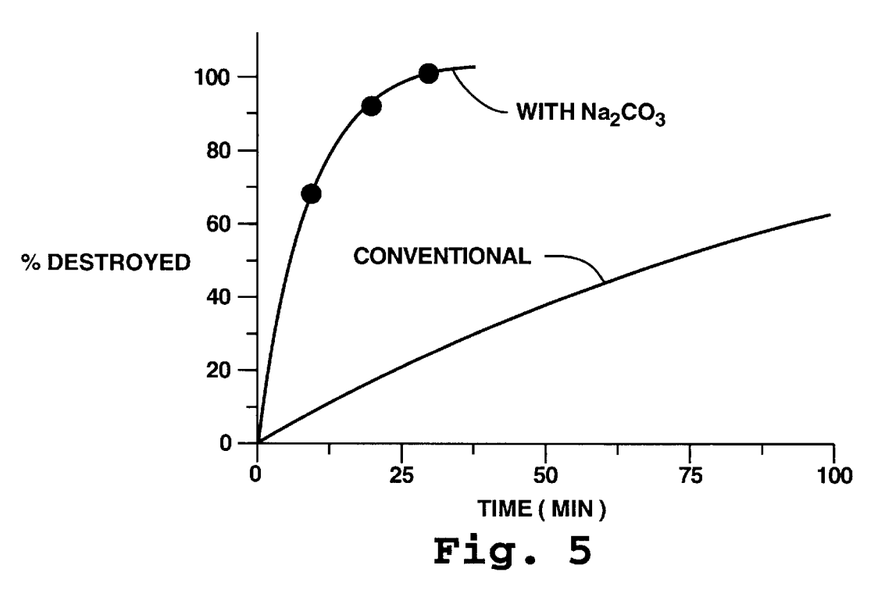
FIG. 5 is a graph representation of the percent of dichlorobenzene destroyed under supercritical water oxidation conditions at 380° C. for specific times of reaction, with and without sodium carbonate.

The studies were conducted in small stainless steel reactors, and the results are presented in FIG. 5. FIG. 5 compares the results with a rate profile projected to our conditions based on the reaction kinetics reported for the conventional, supercritical water oxidation of DCB by Jin et al. (1992). This approach yields a substantially accelerated decomposition rate, and the process appears to be thorough, with the isolated product mixture from a 27-min sodium carbonate reaction showing a total organic carbon (TOC) content of <0.04%. Total conversion of organic chlorine to chloride ion is also achieved.

The hydrogen chloride removal in the presence of specific reactants was demonstrated in comparison to reactions duplicating the results of Jin et al. (1992) using large, practical levels of DCB. In two separate SCWO reactions, large quantities of HCl were produced which corroded the interior reactor surfaces to the point of failure (rupture) during reaction (See FIG. 3 on the left). On the other hand, the reactor used at the conditions of the present invention with specific reactant present was unaffected after several reactions (See FIG. 3 on the right).

Hexachlorobenzene is a common fungicide.

Hexachlorobenzene

Figure 6:
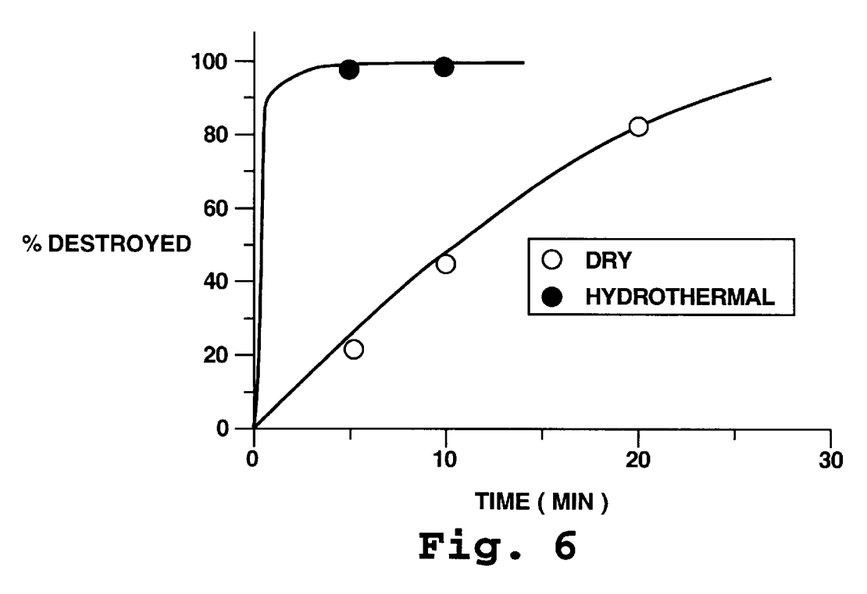
FIG. 6 is a graphic representation of the decomposition of hexachlorobenzene at 380° C. with sodium carbonate, with and without water present.

The data are presented in FIG. 6, at 380° C. (dry and with water) and demonstrate the need to have water present. Thus, in the absence of water, the destruction is slow, but with water present, the rate of reaction is extremely high.

Initial data indicate that a reaction of material with sodium carbonate under the conditions described herein—in the absence of water—also produces useful decomposition of the waste at levels approaching that of the aqueous systems.

The following Examples are presented to be explanatory and descriptive only. They are not to be construed to be limiting in any way.

EXAMPLE 1

Sodium Carbonate Decomposition of p-Dichlorobenzene (a) p-Dichlorobenzene (0.108 g, 0.735 mmol) is placed in a metal reactor (6 mL), with water (2 g), sodium carbonate (0.150 g, 1.4 mmol) and oxygen (13.2 mmol). This reaction mixture is heated at 373° C. for 27 min. at 250 atmospheres, then cooled to ambient. The reaction mixture is almost water-clear and shows a total organic carbon (TOC) of less than 0.04 wt. %.

(b) Similarly, when the decomposition in (a) is repeated except that sodium carbonate is replaced by a stoichiometrically equivalent amount of calcium oxide, the amount of the decomposition of organic compound is substantially the same.

(c) Similarly, when the decomposition in (a) is repeated except that sodium carbonate is replaced by a stoichiometrically equivalent amount of calcium hydroxide, the amount of the decomposition of organic compound is substantially the same.

(d) Similarly, when the decomposition in (a) is repeated except that the p-dichlorobenzene is replaced by a stoichiometrically equivalent amount of tetrachlorobenzodioxin, one or more polychlorinated biphenyl, methylene chloride, chloroform, carbon tetrachloride, methylchloroform, 1,2-dichloroethane, 1,1,2,2-tetrachloroethane, dichlorofluoromethane, 1,2-dichloro-1,1,2,2-tetrafluoroethane, lindane, hexachlorobenzene, or combinations thereof, the amount of the decomposition of the organic compound is substantially the same.

(e) Similarly, when the decomposition in (a) is repeated except that the oxygen is replaced with a stoichometrically equivalent amount of air (having a stoichometrically equivalent amount of oxygen), ozone, hydrogen peroxide, or combinations thereof, the amount of the decomposition of the organic compound is substantially the same.

EXAMPLE 2

Sodium Carbonate Decomposition of Hexa-Dichlorobenzene (a) Hexachlorobenzene is decomposed in the manner described in Example 1 (a). Hexachlorobenzene (0.735 mol) is placed in a metal reactor (6 mL) with water (2 g), sodium carbonate (0.45 g, 4.2 mmol) and oxygen (20 mmol). Hexachlorobenzene has 3 times the organic chlorine to be decomposed. This reaction mixture is heated at 373° C. for 27 min. at 250 atmospheres, then cooled to ambient. The reaction mixture is almost water-clear and shows a total organic carbon (TOC) of less than 0.04 wt. %.

(b) Similarly, when the decomposition in (a) is repeated except that sodium carbonate is replaced by a stoichiometrically equivalent amount of calcium oxide, the amount of the decomposition of organic compound is substantially the same.

(c) Similarly, when the decomposition in (a) is repeated except that sodium carbonate is replaced by a stoichiometrically equivalent amount of calcium hydroxide, the amount of the decomposition of organic compound is substantially the same.

(d) Similarly, when the decomposition in (a) is repeated except that the hexa-dichlorobenzene is replaced by a stoichiometrically equivalent amount of tetrachlorobenzodioxin, one or more polychlorinated biphenyl, methylene chloride, chloroform, carbon tetrachloride, methylchloroform, 1,2-dichloroethane, 1,1,2,2-tetrachloroethane, 1,1,2-trichloroethyline, dichlorofluoromethane, 1,2-dichloro-1,1,2,2-tetrafluoroethane, tetrachloroethylene, lindane, hexachlorobenzene, or combinations thereof, the amount of the decomposition of the organic compound is substantially the same.

(e) Similarly, when the decomposition in (a) is repeated except that the oxygen is replaced with a stoichometrically equivalent amount of air (having a stoichometrically equivalent amount of oxygen), ozone, hydrogen peroxide, or combinations thereof, the amount of the decomposition of the organic compound is substantially the same.

While only a few embodiments of the invention have been shown and described herein, it will become apparent to those skilled in the art that various modifications and changes can be made in the present invention to an improved method of hot water and supercritical water oxidation using specific reactants, such as sodium carbonate, and an oxidant without departing from the spirit and scope of the present invention. All such modification and changes coming within the scope of the appended claims are intended to be carried out thereby.

We claim:

1. A process for the decomposition of material selected from the group consisting of organic compounds, inorganic compounds, or combinations thereof, to compounds which are environmentally acceptable, or which are amenable to further degradation by conventional disposal systems to produce environmentally acceptable products, which process comprises:

(a) conveying an aqueous solution or an aqueous slurry of material to be decomposed into a reaction zone capable of withstanding the temperatures and pressures of decomposition of the material; and (b) contacting the material in the reaction zone in the presence of water with a reactive fluidized bed of a specific reactant present as a solid in an amount effective to decompose the material under hot water or supercritical water oxidation conditions of between about 300° and 600° C. and a pressure of between about 10 and 400 atmospheres, wherein the specific reactant is at least about 90% insoluble in an aqueous medium at said hot water or supercritical water oxidation conditions, and reacts to neutralize any acid gases produced in the decomposition, and wherein the process occurs in the presence of a gaseous oxidant which is present in an amount of between about 0.1 and 50% by weight of the material to be decomposed;

wherein said reactive fluidized bed is fluidized by said oxidant and said solution or slurry, and wherein said specific reactant is selected from the group consisting of sodium carbonate, calcium oxide, calcium hydroxide, magnesium hydroxide, magnesium oxide, and combinations thereof;

said contacting being carried out for a time sufficient to convert about 99% or greater of the material to compounds which are environmentally acceptable, or to conversion compounds which are amenable to further degradation to environmentally acceptable products.

2. The process of claim 1 wherein the gaseous oxidant is selected from the group consisting of air, oxygen, hydrogen peroxide, ozone and combinations thereof.

3. The process of claim 1 wherein the material is selected from the group consisting of ordnance, explosives, chlorofluorocarbons, halogenated organic compounds, chemical warfare agents, insecticides, fungicides, pesticides, cleaning solvents, paint sludges, polymer wastes, and combinations thereof.

4. The process of claim 3 wherein the halogenated organic compounds are selected from the group consisting of tetrachlorobenzodioxin, polychlorinated biphenyl, polybrominated biphenyl, methylenedichloride, trichloromethane, tetrachloromethane, dichloroethylene, trichloroethane, polychlorinated benzene, polychlorohexane, chlorinated olefin, methyl bromide, ethyl bromide, dichlorofluoromethane, 1,2-dichloro-1,1,2,2-tetrafluoroethane, and combinations thereof.

5. The process of claim 1 wherein the specific solid reactant is sodium carbonate.

6. The process of claim 1 wherein the materials of construction of the reaction zone are decomposed at 0.001% or less under the hot water or supercritical water oxidation conditions.

7. The process of claim 1 wherein the material comprises at least one organic compound, which at least one organic compound is present in about 90 weight percent or greater of the total material.

8. The process of claim 7 wherein the at least one organic compound comprises a halogenated organic compound, and the process occurs with less than 0.1 percent decomposition of the materials of construction of the reaction zone.

9. The process of claim 1 wherein in step (b) the temperature is between about 373° and 450° C. and the pressure is between about 220 and 300 atmospheres.

10. The process of claim 9, wherein the temperature is between about 373° and 400° C.

11. The process of claim 1, further comprising:

(d) further degrading the compounds produced in step (c) by subsequent reaction to environmentally acceptable products.

12. The process of claim 11 wherein the materials of construction of the reaction zone are decomposed at 0.1% or less under the supercritical water oxidation conditions.

13. The process of claim 1 wherein in step (b):

the specific solid reactant is sodium carbonate;
    the material to be decomposed comprises one or more organic compounds;
    the temperature of the reaction is between about 374° and 400° C.;
    the gaseous oxidant is air or oxygen; and
    the time is between about 1 and 60 min.

14. The process of claim 13 wherein the gaseous oxidant is oxygen.

15. The process of claim 13 wherein the material is selected from the group consisting of ordnance, explosives, chlorofluorocarbons, halogenated organic compounds, chemical warfare agents, insecticides, fungicides, pesticides, cleaning solvents, paint sludges, polymer wastes, and combinations thereof.

16. The process of claim 15 wherein said halogenated organic compound is selected from the group consisting of tetrachlorobenzodioxin, polychlorinated biphenyl, polybrominated biphenyl, methylenedichloride, trichloromethane, tetrachloromethane, dichloroethylene, trichloroethane, polychlorinated benzene, polychlorohexane, chlorinated olefin, methyl bromide, ethyl bromide, dichlorofluoromethane, 1,2-dichloro-1,1,2,2-tetrafluoroethane, and combinations thereof.

17. The process of claim 1 wherein in step (b) the gaseous oxidant in the reaction zone is oxygen or air.

18. The process of claim 1 wherein in step (b):

the specific solid reactant is sodium carbonate;
    the material to be decomposed comprises one or more organic compounds;
    the temperature is between about 300° and 374° C.;
    the pressure of the reaction is maintained to keep the water present as a gas;
    and the time of reaction is between about 1 and 60 min.

19. The process of claim 18 wherein the gaseous oxidant is oxygen or air.

* * * * *